July 25, 1944. R. W. BROWN 2,354,446
METHOD OF MOLDING AND VULCANIZING HOLLOW ARTICLES
Filed Dec. 9, 1942 4 Sheets-Sheet 1

Inventor
ROY W. BROWN
By Ely & Frye
Attorneys

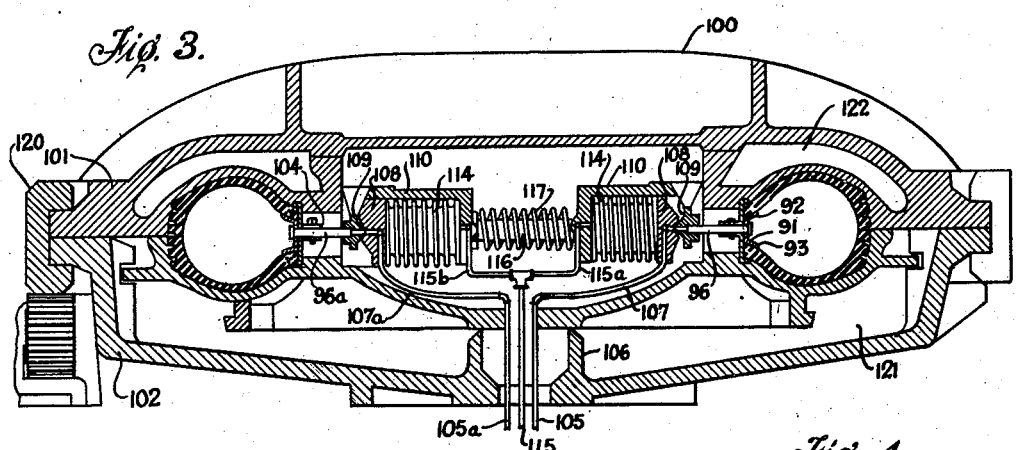
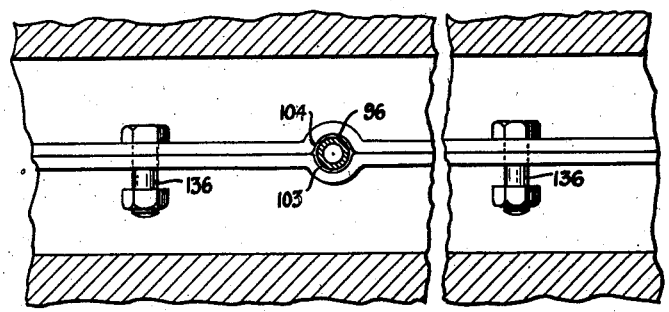
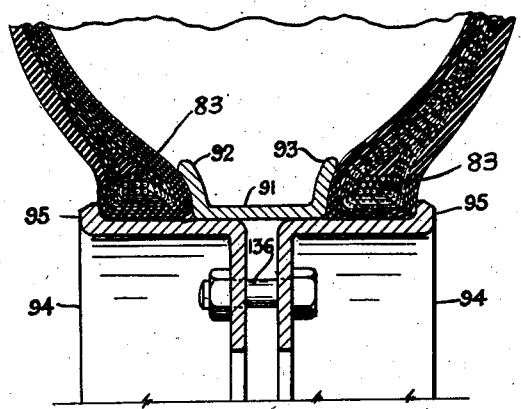
Inventor
ROY W. BROWN

July 25, 1944.  R. W. BROWN  2,354,446
METHOD OF MOLDING AND VULCANIZING HOLLOW ARTICLES
Filed Dec. 9, 1942  4 Sheets-Sheet 3

Inventor
ROY W. BROWN

July 25, 1944.  R. W. BROWN  2,354,446
METHOD OF MOLDING AND VULCANIZING HOLLOW ARTICLES
Filed Dec. 9, 1942   4 Sheets-Sheet 4

Inventor
ROY W. BROWN
By Ely & Frye
Attorneys

Patented July 25, 1944

2,354,446

UNITED STATES PATENT OFFICE 2,354,446

METHOD OF MOLDING AND VULCANIZING HOLLOW ARTICLES

Roy W. Brown, Akron, Ohio, assignor to The Firestone Tire & Rubber Company, Akron, Ohio, a corporation of Ohio Application December 9, 1942, Serial No. 468,336

6 Claims. (Cl. 18—53)

This invention relates to molding and vulcanizing flexible pressure containers, and more particularly to molding and vulcanizing pneumatic tires.

An object of the invention is to provide an improved method of molding and vulcanizing flexible hollow containers such as tires. A further object is to shape a pulley band or drum-built article to torus form and to vulcanize same without the use of an expansible core, and with the molding pressure medium such as air, steam, water, carbon dioxide gas or the like, directly in contact with the inner surface of the article. In one aspect the method of the invention is employed in tire manufacture and is designed to produce a tubeless tire adapted to be used in service with the air used as the medium for the tire inflation pressure in direct contact with the inside ply of the tire.

To this end the present invention, in one form, includes a method of making pneumatic containers or tires in which a cylindrical band or drum built tire, lined on its inside with an impervious rubber compound and having a rubberized cord fabric body, marginal bead portions and a tread portion, is clamped on its bead ends between a bead sealing ring and a portion of a tire mold during vulcanization of the tire, the sealing ring serving to establish a fluid tight contact with beads of a tire and to mold the inside faces of the beads to a predetermined contour. The inner walls of the now tire-shaped band are subjected to direct fluid pressure so as to press the band against the molding surface, the band being vulcanized thereafter in said mold.

The invention also includes a method of making tires which comprises clamping a cylindrical band lined on its inside with an impervious rubber compound and having a rubberized cord fabric body, marginal bead portions and a tread portion, between two spaced and coaxially arranged tire mold portions, moving said mold portions toward each other along their common axis so as to fully enclose the band. This method includes expanding the band in the mold by direct influence of fluid pressure, thereby pressing the band against the mold walls, directly cooling the inner surface of the tire-shaped band while subjecting the outside of the band to vulcanizing temperature, whereupon after a certain time replacing the cooling medium in the cavity of the band by a medium, e. g. water, at a vulcanizing temperature and a pressure adapted to complete the vulcanization of the tire.

Figures 1, 2:
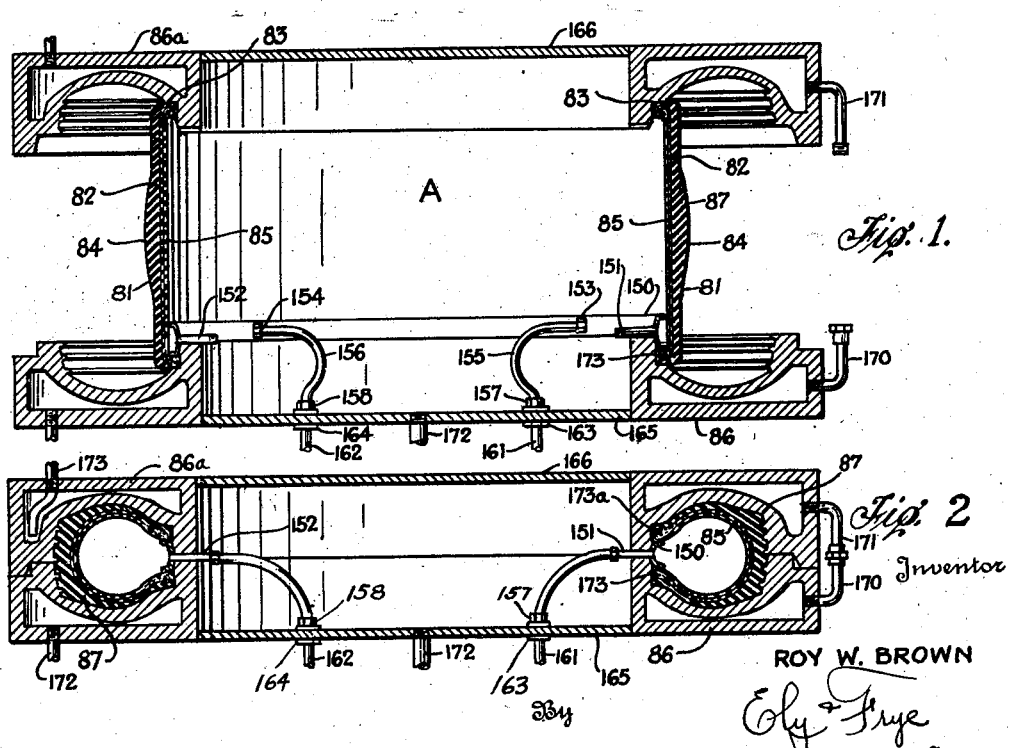
Figure 1 is a diametric section of a tire band and a tire mold, in accordance with the invention, showing how assembly is effected before the band is distended to tire shape.
Figure 2 is a diametric sectional view of a finished tire made from the band illustrated in Figure 1, in accordance with the method of the invention, and a mold in which the tire is confined during vulcanization.
Figure 6:
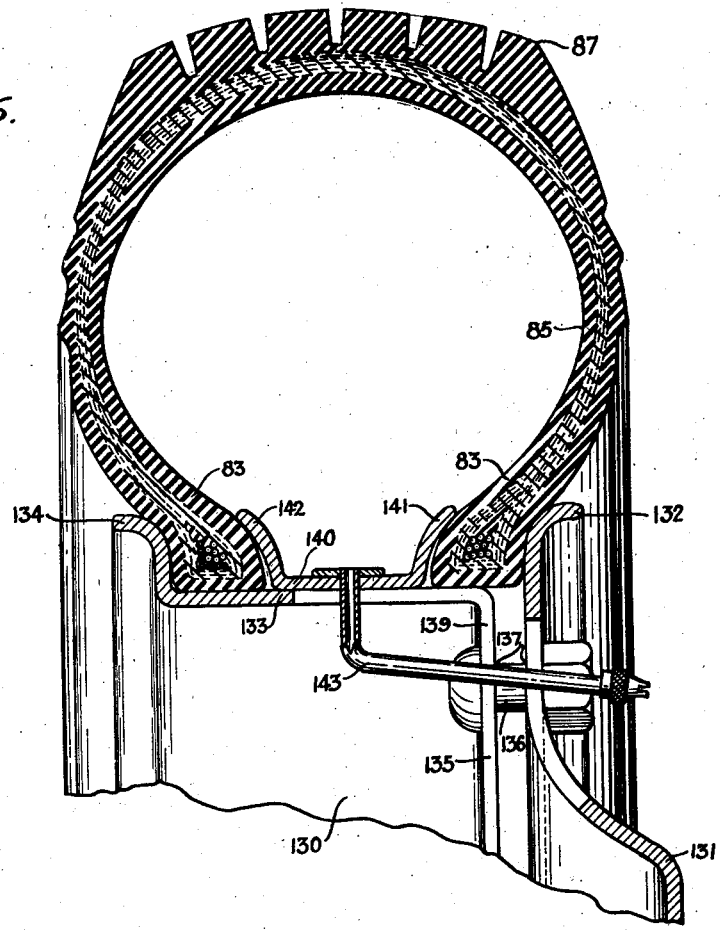
Figure 7:
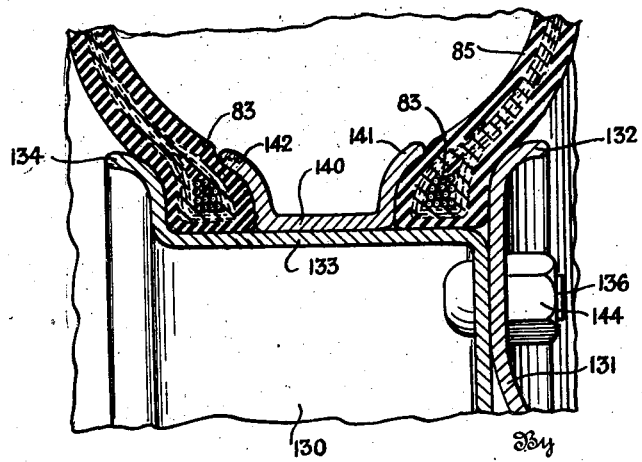
Figure 8:
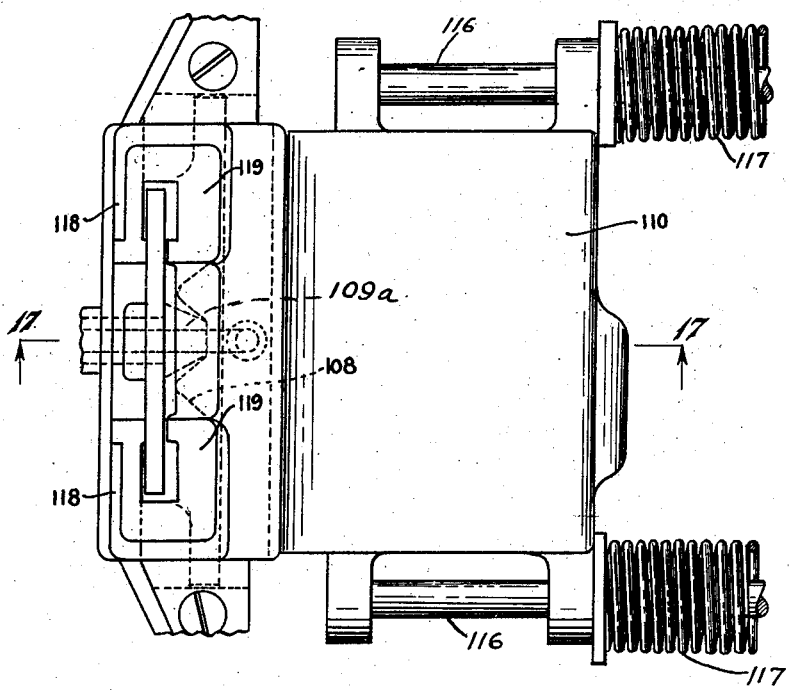
Figure 9:
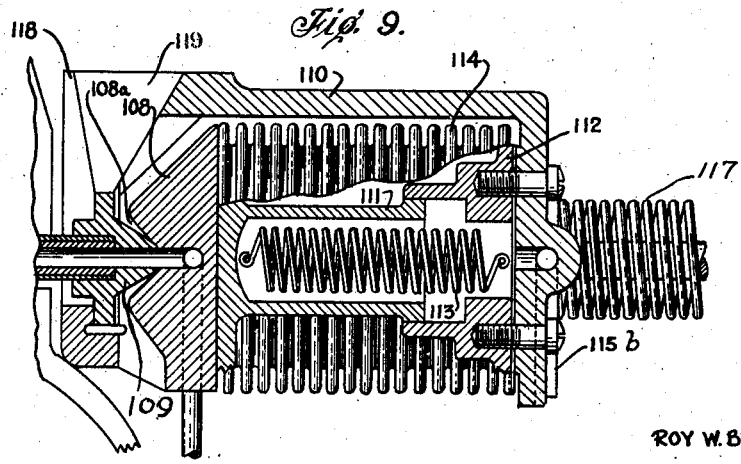

Figure 3 is also a diametric sectional view of a finished tire made from the band illustrated in Figure 1 in accordance with the method of the invention, shown in the position the tire will occupy during vulcanization in a mold which mold is adapted to circulation of a pressure and curing medium within the tire and in direct contact therewith, said tire being mounted on curing rings with a sealing ring in position;

Figure 4 is an elevation of a fragment of the inside of the curing ring illustrating the construction of the curing ring at the valve stem passageway portion;

Figure 5 is a fragmentary sectional view showing the tire of Figure 3 on the tire's curing rings with a sealing ring mounted in the tire and illustrating the manner in which the curing rings are spaced apart immediately before the vulcanizing mold shown in Fig. 3 presses said rings together;

Figure 6 is a sectional view of the finished tire shown in Figure 3 mounted on a circumferentially divided tire rim with a tire sealing ring and showing the relative position of the tire, tire beads, sealing ring and the tire road rim, when the tire is mounted for use in service without an inner tube, and before the divided rim is bolted firmly together;

Figure 7 is the same as Figure 6, except only the bead portions of the tire are shown, and except the divided rim is shown bolted tightly together with the beads of the tire pressed firmly against the sealing ring, the view being taken at a point removed from the valve stem shown in Figure 6;

Figure 8 is an enlarged plan of a portion of the sealing ring connections shown in Figure 3; and Figure 9 is a section on line 17—17 of Figure 8.

This application is a continuation-in-part of my co-pending application Serial No. 337,235, filed May 25, 1940, as a continuation-in-part of my application Serial Number 75,168, filed April 18, 1936, which is now Patent No. 2,221,470, dated November 12, 1940.

In operation this invention employs apparatus, certain features of which are disclosed in my prior Patent No. 1,908,282, granted May 9, 1933, and also prior Patent No. 2,265,346, dated December 9, 1941, of which I am a coinventor.

Figure 1 illustrates a tire band 81 that has been assembled on a drum type tire building drum, not shown, and manufactured in accordance with the usual drum building practice which is well known to the art. The cylindrical band 81 comprises the usual rubberized cord fabric body 82 having marginal inextensible bead portions 83 and a tread portion 84. The interior of the pulley band is provided with a layer or skin coat of impervious rubber compound 85 which may be laminated to insure an impervious structure. The band is shaped by forcing same into tire mold sections 86a, 86 by expanding the pulley band into the mold by means of fluid pressure and thereafter filling the cavity of the tire with a cold fluid medium, e. g., cold water, under sufficient pressure to hold the tire in contact with the mold cavity, while the outside of the tire is subjected to vulcanizing temperature. The tire cords are thus molded into proper toroidal form and set before the inner coating of impervious rubber becomes softened by the elevated temperature. Thereafter the cold water in the tire cavity is replaced by a fluid pressure medium, e. g., water, at the vulcanizing temperature and pressure to complete the tire 87 as illustrated in Figure 2. The tire mold sections 86a and 86 are steam jacketed in a conventional manner and carry respective pipes 170 and 171 which makes an automatic connection with each other when the mold section 86a registers against the mold section 86 as will be understood by those familiar with the art. Steam from any suitable source is supplied to the mold section 86a through inlet pipe 170 through proper connections and controls (not shown, but of any common type) said steam passing to section 86 through pipes 170. Outlet pipe 172 from mold section 86 is connected to suitable steam traps (not shown). The open centers of the said mold sections are closed by covers 165 and 166 which may be welded to the mold sections or otherwise held in position. By reference to the tire and mold of Fig. 1 it will be seen that a channel shaped bead sealing ring 150 has been mounted in tire or band 81 and that the sealing ring 150 has diametrically opposite duct members or stems 151 and 152 which may be attached to the base of said sealing ring 150 by any method found satisfactory. These members have threaded ends adapted to receive attachment nuts 153 and 154 respectively, which nuts are carried on the ends of flexible hose 155 and 156 respectively. Said flexible hose extends from pipes 161 and 162 respectively. The pipes, one an inlet 161 and one an outlet 162, are threaded through the bossed portions 163 and 164 of the bottom cover plate 165 with a threaded end of said pipes projecting beyond said bottom cover and receiving the hose attaching nuts 157 and 158. An air inlet and outlet pipe 172 is threaded into position in the lower cover 166 of the mold.

After the tire band 81 has been completed it is removed from the building drum 80 and the sealing ring 150 is mounted between the bead portions 83, after which the band 81 and sealing ring 150 are placed in the mold section 86 as shown in Fig. 1. Next the attaching nuts 153 and 154 are run down on the threaded ends of the stems 151 and 152 respectively, after which the mold section 86a is positioned against the upwardly extending bead portion 83. It is to be understood that the mold sections 86a and 86 may be carried on proper supporting members of any type now commonly used by tire manufacturers. With both marginal edge bead portions 83 against the mold sections 86a and 86, a closed chamber A is formed by said mold sections with their closed covers 165 and 166 and the tire or band 81. The mold sections are next brought together or caused to register, however, in order to properly position the tire or band 81 within the mold cavity air under pressure is permitted to enter the chamber A through pipe 172 which forces the tread or central portion of the band 81 outwardly, the inextensible bead portions 83 remaining in contact with bead seats 173 and 173a of the mold sections. Only enough air pressure is built up in the chamber A to prevent the band or tire 81 from buckling inwardly as the bead portions of the tire are being brought toward each other and just before the tire bead portions contact the sealing ring the air is allowed to escape from chamber A through pipe 172. As the mold sections come into register as shown in Fig. 2 the sealing ring 150 is firmly pressed against the said bead portions so that an air and water tight seal is formed between the sealing ring and the skim coat of impervious rubber 85. With the mold closed, as it is sometimes referred to, the molding and vulcanizing of the tire proceeds by turning cold water under pressure into the tire through pipe 161, hose 155 and valve stem 151. By this water pressure the tire is forced outwardly against the steam jacketed mold sections where the outside of the tire is subjected to vulcanizing temperature, while the inside of the tire remains relatively cool and the rubber 85 unsoftened. After the outside of the band or tire has been molded and pressed into its final shape forming the finished tire 87, then the vulcanization of the molded tire is completed by opening the outlet pipe 162 and turning in hot water through the inlet pipe 161, thus circulating hot water through the tire in direct contact with the inside thereof. Since the cold water keeps the rubber on the inside of the tire from becoming soft until the outside of the tire has softened from the heat of the mold and has become molded it will be seen that when the inside rubber of the tire becomes soft, little or no movement of the rubber results and accordingly no ruptures in the inside rubber coat of the tire results and therefore a tire whose inside will not permit air to pass therethrough has been produced. To remove the tire from the mold composed of sections 86a and 86 the water pressure is shut off and drained out through outlet 162. The section 86a lifted from contact with the tire, the connections with the sealing ring stems broken and the tire and sealing ring removed from the mold section 86 after which the sealing ring is dismounted from the tire 87 completing one cycle of the manufacturing operation.

In Figures 3 and 5 there are illustrated vulcanizing apparatus adapted to circulate within the tire whatever pressure medium that may be used; such as, for example, water or steam. This vulcanizer is substantially the same as that shown in Figures 11, 12, 13 and 14 of applicant's Patent No. 1,908,282, issued May 9, 1933, however, some modifications have been necessary for its adaptation to the present invention and accordingly it will now be briefly described in connection with the vulcanization of the tire 87 shown in Figure 2 of the present application.

When the drum built tire or band 81 is to be vulcanized in the mold shown in Figures 3 and 5 the tire is pre-shaped and mounted on conventional curing rings 94, 94 with a rigid sealing ring 91 in position within the tire. The ring 91 has outwardly extending flanges 92 and 93. (See Figure 4.) The pre-shaping of the tire is done in any manner found satisfactory, as for example, on a vacuum shaper, several types of which have been in commercial use for many years. After the tire has been removed from the tire shaper the sealing ring 91 is placed in the tire and the tire and sealing ring are mounted on curing rings 94, 94 the curing rings being loosely bolted together, bolts 136 being used for this purpose. The distance between the outwardly extending flanges 95, 95 of the curing rings is such that the marginal bead portions 83 of the tire 87 are molded between the said flanges of the sealing ring and the said flanges of the curing rings as will now be explained. By reference to Figure 4 it will be seen that the marginal bead portions 83 are too wide to permit the curing rings 94, 94 to completely close or register. Therefore, when the assembly of the tire rim and sealing ring is laid in a tire mold and the mold is closed the curing rings will be forced together and the tire beads 83 will be compressed to conform to the shape of the space defined between the sealing ring and the curing rings, in which space and in such compressed condition, vulcanization of the bead portions of the tire takes place, with the result that the said bead portions permanently retain substantially such molded shape. The sealing ring 91 is provided with two diametrically opposite duct stems 96 and 96a shown in Figure 3 and as will be understood by those familiar with the art, the assembled tire and curing rings are laid in a vulcanizing mold, the said mold being closed and an internal pressure medium, such as water or steam is led into the tire through the duct stems. In the conventional method, of course, the said duct stems led into a curing bag mounted in the tire. In the present invention the curing bag is omitted.

Referring now to Figs. 3, 7 and 8, it will be seen that the vulcanizer there shown comprises a steam jacketed mold 100 consisting of an upper portion 101 and a lower portion 102, said portions having registering recesses therein which together constitute a mold opening conforming in shape to the exterior contour of a tire molded therein. The duct stems 95 and 95a extending inwardly from the sealing ring 91 passes through outlet openings 103 and 104 formed between the curing rings 94, 94. A supply line 105 and an outlet line 105a extend upwardly through a sleeve 106 and are connected by flexible branch ducts 107, 107 to connection members 108, 108 arranged for cooperation with connection members 109, 109 on the stems 96 and 96a. Connection members 108 are shiftable in supporting member 110, 110 by means of sleeves 111 thereon which are slidable in a sleeve member 112 mounted on said supporting members, said supporting members being normally urged inwardly of the vulcanizer by spring 113 between said connection members and the supporting members. Sylphons 114 are secured between the supporting members 110 and the connection members 108 about the sleeves 111 and 112, and flexible branch ducts 115a and 115b running out of a supply line 115 are connected to the interiors of said sylphons 114 through the supporting members 110.

The supporting members 110 are shiftably mounted on rods 116, 116 and are normally urged outwardly thereon by springs 117, 117. These supporting members 108 have jaws 118, 118 thereon provided with downwardly tapered openings 119, 119 in the upper surfaces thereof adapted to guide connection members 109 into cooperation with connection members 108, members 108 having conical sockets 108a, and member 109, a conical plug 109a, for engaging in socket 108a.

When the assembled tire and curing ring are laid in the lower portion 102 of the mold 100 the connection members 109 are pushed down in jaws 118 into cooperation with connection members 108. The upper mold portion 101 is then pressed, either mechanically or otherwise, onto the lower vulcanizer portion 102 to close the mold. The mold is locked against opening from the internal molding pressure within the tire by any suitable means, as by a conventional locking ring 120. It is to be understood that, if desired, the upper and lower portions of the mold 100 may be mounted by any one of several methods now used commercially in the industry. The mold sections or portions 101 and 102 are each chambered as at 121 and 122, respectively, for the introduction of a fluid heating medium such as steam therein. The portions 101 and 102 are accurately guided into mating relation by means of dowels or other suitable means, not shown. The molding and vulcanizing of the tire may be accomplished in a manner similar to that described in connection with Figs. 1 and 2, it being understood, of course, that the inlet and outlet lines 105 and 105a will be utilized in the same manner as the inlet and outlet lines 161 and 162 of Fig. 2.

It will now be seen that the above described method of manufacturing tires produces a tire such as the tire 87 which is adapted for use in service as a tubeless tire. Figures 6 and 7 illustrate a tubeless mounting of tire 87. This mounting 130 comprises a wheel assembly that includes a wheel disc 131 having a tire engaging flange 132 at its outer edge. The wheel disc 131 combines with an annular rim section 133 having an outwardly directed tire engaging flange 134 at one edge thereof and a radially inwardly directed flange 135 adapted to abut against a portion of the wheel disc 131 formed at the other edge thereof. Rim bolts 136 extend through holes 137 to secure the wheel disc and rim section together to form a split rim and wheel unit. Bolts 136 are of sufficient length to permit the rim section 133 to be laterally spaced an appreciable distance from the wheel disc 131 when the bolts extend loosely between the wheel disc and the rim section. A valve receiving slot 139 is formed in the flange 135 of the rim section 133 which slot extends over half way in through the section 133, as shown. A corresponding slot 137 is formed in the wheel disc 131 and is adapted to be aligned with the slot 139 when the wheel is assembled.

A sealing ring 140 having outwardly extending flanges 141 and 142 is mounted between the marginal bead portions 83 of the tire 87. An anglevalve innertube valve stem 143 is attached to the base of the sealing ring 140 in any manner found satisfactory whereby a tire inflation medium such as air, may flow through the stem 143 into the tire 87. The outer lateral faces of the flanges 141 and 142 correspond closely to that of the flanges 92 and 93 of the rigid sealing ring 91 used to mold the said bead portions, however, it is to be noted that the said flanges of the sealing ring 140 flare laterally upwardly and outwardly at a greater angle with the outer face of the base of ring than do the flanges 92 and 93 with the outer surface of the base of the sealing ring 91. Because of this difference in the sealing rings 91 and 140 the outer edges of the flanges 141 and 142 will contact the inside of tire 87 first, when said tire is pressed inwardly against the sealing ring 140 by the flanges 132 and 134 as will now be explained.

In operation the mounting of the wheel assembly is accomplished by first placing the ring 140 in the tire 87 in the usual manner of mounting tire bead lock ring, tire flaps and the like. Then with the disc 131 removed from the rim section 133 the tire 87, together with the ring 140, is placed in position on the rim section 133 with the valve stem 143 in position in the slot 138. Next the disc 131, with the valve opening 137 aligned with the slot 137 and the valve stem 143 projecting through said opening 137, receives the section 133 in bolted relation, the bolts 136 being used for this purpose. This manner of assembly will be understood by those familiar with the art and further discussion is considered to be unnecessary, however, it is to be noted by reference to Fig. 7 that the invention contemplates a width for the sealing ring 140, and the tire bead portions 83 which together are a greater width than the width between the tire engaging flanges 134 and 132 when the members 131 and 135 are in contact. Consequently as the rim section 133 is drawn toward the disc 131 by tightening down nuts 144 the outer edges of the flanges 141 and 142 of the sealing ring 140 will first contact the inner portion of the tire 87. As the members 133 and 131 are drawn toward each other the appreciable distance they were separated until they are in abutted relation the tire portions 83 are firmly clamped between the sealing ring flange 141 and the rim section flange 134 on one side of the assembly and between the flange 142 and 132 on the other side. The sealing ring 140 is preferably composed of spring steel so that as the tire presses against the peripheral edges of the flanges 141 and 142 these flanges will be pressed laterally inwardly, whereby a positive air tight seal between the inside of the tire and the sealing ring is assured, since any fatigue or flow of rubber away from the pressure of the sealing ring 140 will be followed up by the laterally inwardly pressed spring steel flanges 141 and 142. It is to be noted that upon first contact of the edges of the flanges 141 and 142 with the rubber 85 that almost a line contact is made which insures high unit pressure contact, however, as the edges of the flanges sink into the rubber more surface of the flanges become progressively involved thereby providing a limit to the distance the flanges may sink into the rubber coat 85 whereby contact between said flanges and the fabric plies of the tire 87 is prevented. It is also to be noted that the contour of the bead portions 83 are molded to exact shape by the sealing ring used during the molding of the tire thereby establishing a positive relation between the tire sealing beads on a tire road rim and the tire bead portions. As has been explained herein the inside plies of the container or the tire being manufactured are rubber plies which are impervious to water, air, or steam or the like. This imperviousness of the inside rubber plies is made positive by the method of vulcanizing wherein cold water is used against the inner rubber plies as a molding pressure medium until the rubberized fabric of the tire, or article being vulcanized, is at least partially molded and vulcanized and thereby becomes more nearly impervious to water, air, or steam after which the cold water is replaced with hot water, steam or air, and the inside rubber plies vulcanized. By this method the inside rubber plies are prevented from becoming softened by heat during the tire molding operation, at which time there is a considerable amount of commotion and shifting of the material composing a tire which movement of the material tends to cause strains and ruptures through which air under pressure would pass.

It will now be seen that applicant has produced a tubeless tire by a method not heretofore known and that applicant's invention is a substantial contribution to the art, particularly so, in that it represents a reduction in the amount of rubber heretofore required to provide a given tire mileage.

Modifications may be resorted to without departing from the spirit of the invention or the scope of the appended claims.

I claim:

1. The method of vulcanizing hollow articles comprising rubber which comprises injecting cold fluid into the interior of the article, heating the article from the exterior thereof for an interval sufficient to effect partial vulcanization of the structure, and then replacing the cold fluid with fluid at vulcanizing temperature and completing the vulcanization of the article.

2. The method of vulcanizing hollow articles comprising rubber which comprises enclosing the article in a mold, injecting cold fluid into the interior of the article, heating the mold to initiate vulcanization of the article from the exterior thereof, and thereafter replacing the cold fluid with fluid under pressure and at vulcanizing temperature.

3. The method of vulcanizing hollow articles comprising rubber which comprises enclosing the article in a mold, applying pneumatic pressure to the interior of the article to press it firmly against the mold walls, replacing the pneumatic pressure with cold water under pressure, heating the mold to initiate vulcanization of the article from the exterior thereof, and thereafter replacing the cold fluid with fluid under pressure and at vulcanizing temperature and circulating said fluid to complete vulcanization of the article.

4. The method of vulcanizing hollow articles comprising fabric and lined with rubber which comprises applying vulcanizing heat to the exterior of the article while maintaining cold water under pressure in direct contact with the rubber lining of the structure for an interval sufficient to "set" the rubber about the fabric of the structure, replacing the cold water with water under pressure at vulcanizing temperature, and circulating the hot water therein until complete vulcanization of the article is effected.

5. The method of molding and vulcanizing a pneumatic tire having its inner surface completely covered with rubber which comprises supplying an internal fluid molding pressure medium directly in contact with the inside surface of said rubber, said medium being of a temperature lower than that required to substantially soften said rubber, applying molding pressure, initiating vulcanization from the exterior of the tire while maintaining the interior of said tire at lower than a rubber softening temperature, and thereafter raising the temperature of the interior of the tire to vulcanizing temperature to complete vulcanization of the tire.

6. The method of vulcanizing tubeless tires comprising an outer rubber layer, a body of rubberized fabric or cords, and an impervious inner lining of rubber, which includes the steps of enclosing the unvulcanized tire in a mold, applying internal cold fluid pressure against said inner lining to compress and compact the components of said tire and to force the outer rubber layer into intimate contact with said mold while heating said mold, and then completing the vulcanization by heating both the interior and exterior of the tire.

ROY W. BROWN.